United States Patent
Nakamura et al.

[11] Patent Number: 6,127,763
[45] Date of Patent: Oct. 3, 2000

[54] AC GENERATOR HAVING CLAW-POLE ROTOR

[75] Inventors: Shigenobu Nakamura, Anjo; Hiroshi Shibata, Chita-gun, both of Japan

[73] Assignee: Denso Corporation, Kariya, Japan

[21] Appl. No.: 09/343,478

[22] Filed: Jun. 30, 1999

[30] Foreign Application Priority Data

Jul. 29, 1998 [JP] Japan .................................. 10-214473

[51] Int. Cl.⁷ ................................................. H02K 19/22
[52] U.S. Cl. .......................................... 310/263; 310/254
[58] Field of Search .................... 310/263, 216, 310/218, 195, 261, 254, 257

[56] References Cited

U.S. PATENT DOCUMENTS

| | | | |
|---|---|---|---|
| 4,201,930 | 5/1980 | Inagaki et al. | 310/51 |
| 4,263,526 | 4/1981 | Taguchi et al. | 310/263 |
| 4,418,295 | 11/1983 | Shiga | 310/59 |
| 5,122,705 | 6/1992 | Kusase et al. | 310/68 D |
| 5,233,255 | 8/1993 | Kusumoto et al. | 310/263 |
| 5,343,105 | 8/1994 | Sakabe et al. | 310/179 |

FOREIGN PATENT DOCUMENTS

| | | | |
|---|---|---|---|
| 0198095 | 10/1986 | European Pat. Off. | H02K 1/24 |
| 56-150955 | 11/1981 | Japan | H02K 19/22 |
| 57-113761 | 7/1982 | Japan | H02K 19/22 |
| 57-122657 | 7/1982 | Japan | H02K 19/22 |
| 3-226251 | 10/1991 | Japan | H02K 19/22 |

*Primary Examiner*—Clayton LaBalle
*Assistant Examiner*—Burt Mullins
*Attorney, Agent, or Firm*—Pillsbury Madison & Sutro LLP

[57] ABSTRACT

An alternator for vehicle includes a stator and a rotor. The stator is composed of a stator core which is a lamination of steel-sheets and stator winding. The rotor is composed of a pole core, a pair of cooling-fans disposed on opposite axial ends of the pole core and a field coil. The pole core is composed of a cylindrical center core, a pair of disk yokes extending from the center core and claw-pole-pieces extending from the disk yokes to longitudinally cover the field coil. In such a generator, a ratio Y/X of a circumferential distance Y between the adjacent claw-pole-pieces to a circumferential width X of the tooth edges and a ratio r1/R1 of the inside diameter r1 of a cylindrical space where the claw-pole-pieces are disposed to the outside diameter R1 of the same are in specific ranges.

3 Claims, 3 Drawing Sheets

S3=S2>S1

EFFECTIVE
MAGNETIC FLUX

AC GENERATOR HAVING CLAW-POLE ROTOR

CROSS REFERENCE TO RELATED APPLICATION

The present application is based on and claims priority from Japanese Patent Applications Hei 10-214473 filed on Jul. 29, 1998, the contents of which are incorporated herein by reference.

BACKGROUND OF THE INVENTION

1. Field of the Invention

The present invention relates to an AC generator mounted in a vehicle.

2. Description of the Related Art

Reduction in fuel consumption of vehicles has been required by various regulations including CAFE corresponding to the earth environmental protection. Accordingly, the size and weight of AC generators have been reduced by reducing various losses of the AC generator, thereby improving the efficiency of the generator.

Main losses of the AC generator are copper loss of the stator coil and field coil, rectifier loss generated during the conversion from AC power to DC power, core loss including eddy current loss and hysteresis loss, and the mechanical losses including cooling fan loss and brush loss. The copper loss, rectifier loss, core loss and brush loss can be reduced by traditional ways of selection of material to be used or shapes to be designed. However, it is difficult to improve cooling efficiency of the generator.

A rotor disclosed in JP-U-5-11769 is designed to be flat to increase the surface area of field coil in contacted with the pole core, thereby improving heat-dissipation. Although the increased heat-dissipation improves the efficiency of the AC generator, the radial size of the AC generator necessarily increases, resulting in difficulty to provide a radially-wider space for the generator in the vehicle engine compartment.

An AC generator disclosed in JP-B2-59-42546 has an axial flow type cooling-fan to improve the cooling effect. However, it is difficult to increase an amount of cooling air as the size of the generator become smaller.

SUMMARY OF THE INVENTION

Therefore, an object of the present invention is to provide a powerful AC generator having an improved cooling-structure for the field coil.

According to the invention, a ratio of circumferential distance Y between adjacent claw-pole-pieces to circumferential width X of a tooth edge is between 2 and 3.3, and a ratio of the inside diameter r1 of a cylindrical space in that the claw-pole-pieces are disposed to the outside diameter R1 of the same is between 0.78 and 0.8.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
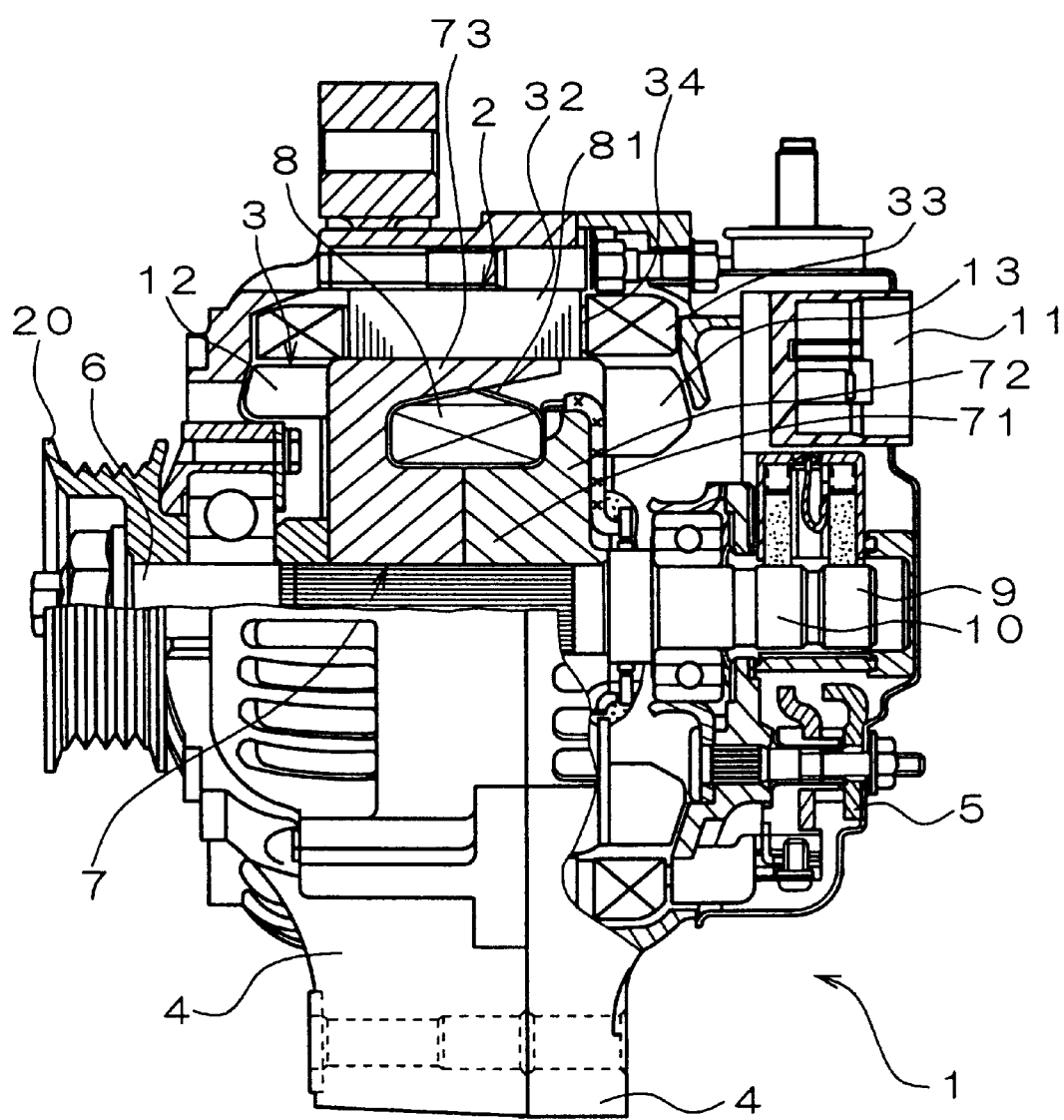
FIG. 1 is a partially cross-sectional side view illustrating a main portion of a vehicular AC generator according to a preferred embodiment of the invention.

An AC generator for a vehicle according to a preferred embodiment of the present invention is described with reference to the appended drawings.

AC generator 1 is composed of stator 2, rotor 3, housing 4 which supports rotor 3 and stator 2, rectifiers 5 which converts AC voltage of generator output power to DC voltage and a voltage regulator controlling the output voltage by controlling the field current.

Rotor 3 has shaft 6 fixed thereto to rotate together, pole core 7 having axial length Lr, front cooling-fan 12 welded to the axially front end of pole core 7, rear cooling-fan 13 welded to the opposite end of pole core 7, field coil 8, and brush-and-slip-ring units 9, 10. Shaft 6 carries pulley 20 at one end thereof to be rotated by an engine (not shown). Pole core 7 is composed of cylindrical center core 71, a pair of disk yokes 72 extending radially outward from the opposite axial ends of center core 71 and a plurality of claw-pole-pieces 73.

Figure 2:
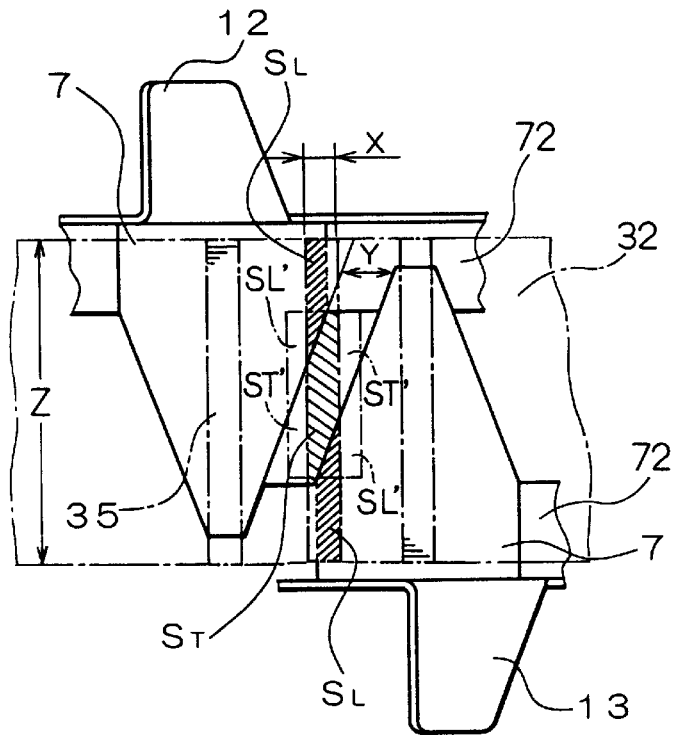
FIG. 2 is a schematic diagram of tooth edges relative to claw-pole pieces of the AC generator.
Figure 3:
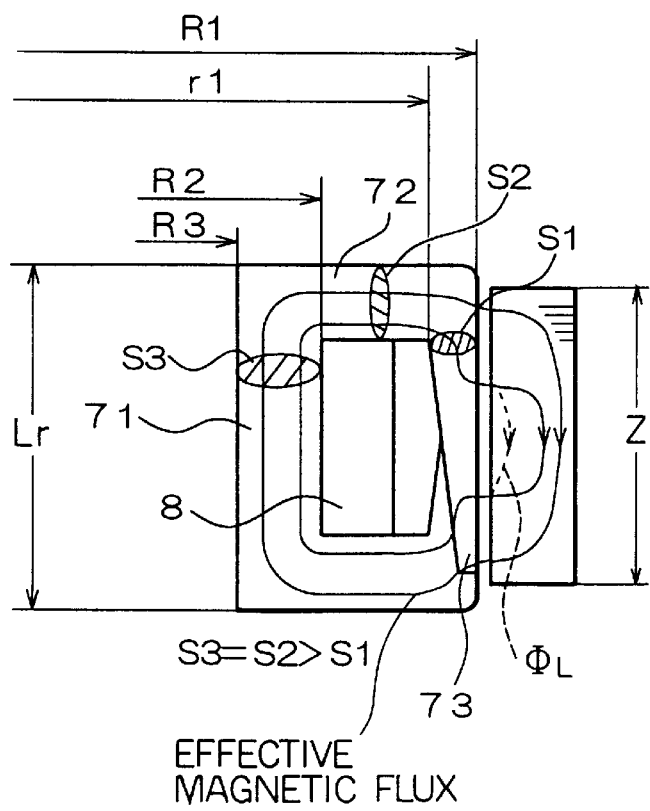
FIG. 3 is a schematic diagram of magnetic flux paths of the AC generator.

As shown in FIGS. 2 and 3, the plurality of claw-pole pieces 73 extend alternately from the pair of disk yokes 72 in the axial direction thereof with circumferential distance Y from each other and are disposed in a cylindrical space that has the outside diameter R1 and the inside diameter r1.

A ratio of the inside diameter r1 of the cylindrical space to the outside diameter of the same is between 0.78 and 0.80.

Field coil 8 is press-fitted to the outer periphery of center core 71 via insulation bobbin 81 and enclosed by the plurality of claw-pole-pieces 73. Field coil 8 and bobbin 81 is bonded to pole core 7 by resin or the like. Front and rear cooling-fans 12 and 13 are thermally connected with pole core 7 so that heat of disk yoke 72 can be transferred to blades of cooling fans 12 and 13.

Stator 2 is composed of stator core 32, stator winding 33 and the insulators 34. Stator core 32 is composed of plural laminated steel-sheets. The thickness of each steel sheet is about 0.6 mm. Stator core 32 has a plurality of tooth edges 35 on the inner periphery thereof and the corresponding slots formed between tooth edges 35. Stator winding 33 is composed of the in-slot portions inserted into the slots and coil-end portions extended from the slots.

Each of tooth edges 35 has circumferential width X and axial length Z, which is sufficient to cover the radially outer surfaces of the opposite disk yoke 72 in the axial direction. A ratio of the distance Y between the adjacent claw-pole-pieces 73 to the circumferential width X is designed to be between 2 and 3.3. Accordingly, the opposite ends of tooth edges 35 are disposed near cooling fans 12 and 13 at the opposite ends thereof, so that heat of tooth edges 35 can be transferred to cooling fans 12, 13 more easily.

A ratio of the axial length Z of stator core 32 to the axial length Lr of pole core 7 is between 0.75 and 0.95.

Figure 4:
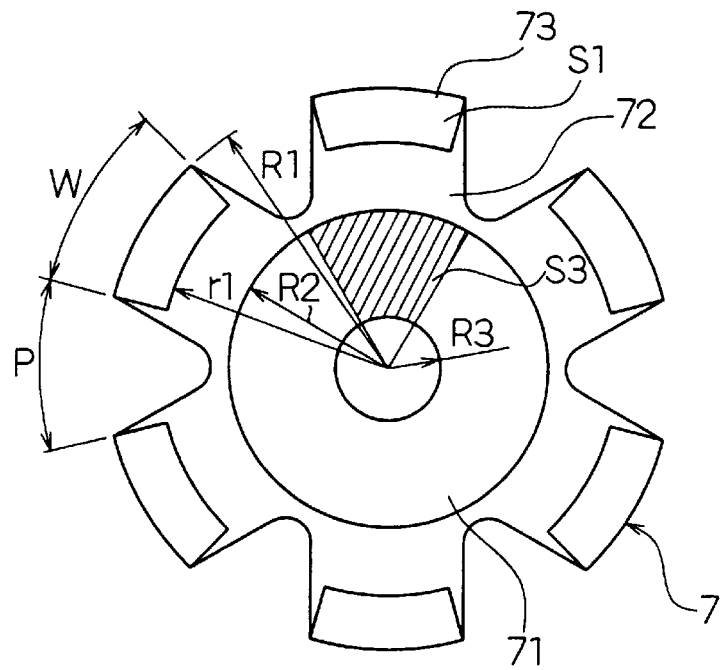
FIG. 4 is a schematic diagram of the rotor according to the preferred embodiment.

In FIG. 4, the cross-sectional area of the shaft whose diameter R3 is about 18% of the outside diameter of pole core 7 is subtracted from the cross-sectional area of cylindrical portion 71 having outside diameter R2.

Therefore, the cross-sectional area S3 each pair of the poles is expressed as follows: $S3=(\pi/4P)\cdot(R2^2-R3^2)$. The cross-sectional area of yoke portion 72 each pair of poles is also designed to be equal to S3.

Thus, the heat generated in the stator 2 is effectively radiated from the tooth edges of stator core 32 to pole core 7.

Positional relationship between pole cores 7 and tooth edges 35 is schematically illustrated in FIG. 2. The axial length Z of tooth edge 35 is designed so that tooth edge bridges or longitudinally covers disk yoke 72 of opposite ends of rotor 3, and the circumferential width X is designed so that area $S_L$ of tooth edge faces claw-pole-piece 73 is as same as that of a common AC generator. If claw-pole-piece 73 is not different from a common AC generator in shape and size, the area $S_T$ of the tooth edge 35 that faces field coil 8 directly becomes smaller than the area $S_T'$ of a common AC generator, and the remainder $S_L$ becomes larger than the area $S_L'$ of the same, as illustrated in FIG. 2.

Therefore, the heat radiated from tooth edges 35 can be easily dissipated to cooling-fans 12 and 13. Because the area $S_T$ of tooth edge 35 facing field coil 8 is decreased, the heat radiated to the field coil 8 from tooth edges 35 can be reduced.

Figure 5:
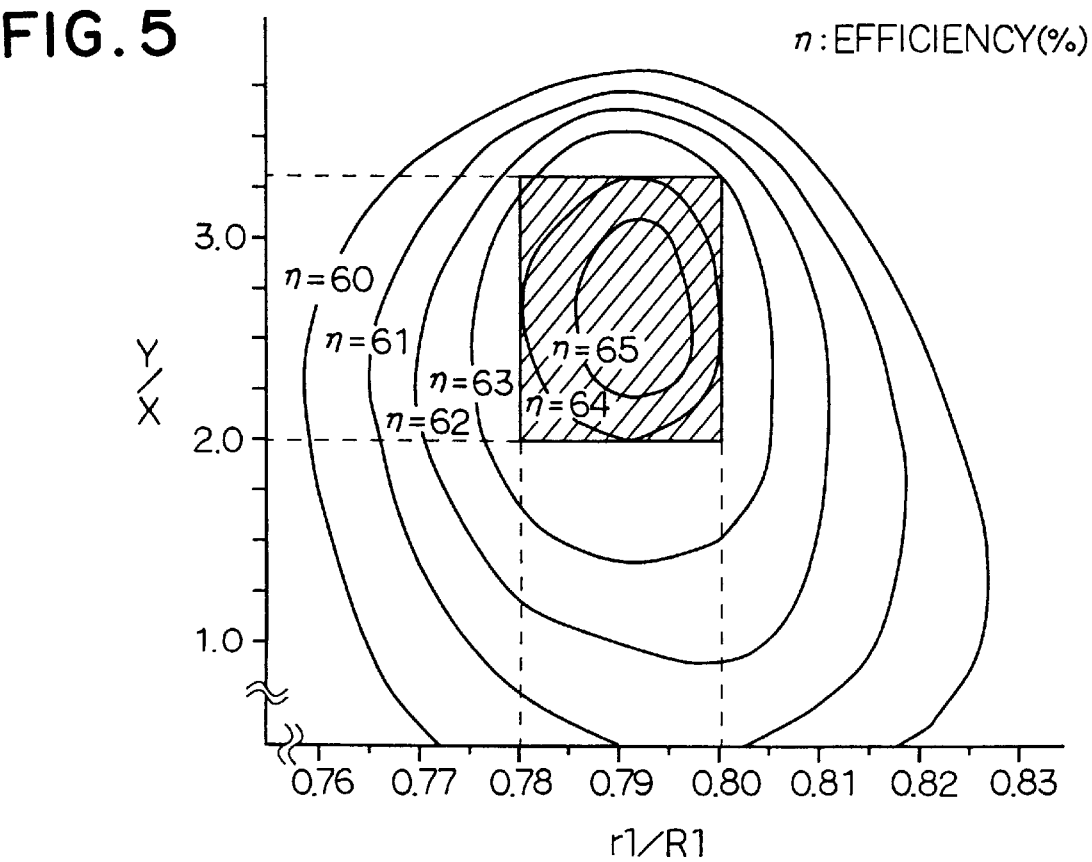
FIG. 5 is a graph showing specific relationship between efficiency of the AC generator and ratios of sizes of main portions of the AC generator.

As shown in FIG. 5, the 12-poled AC generator efficiency varies with the ratio Y/X of the circumferential distance between adjacent claw portions 73 to the circumferential width of tooth edge 35 and the ratio r1/R1 of the inside diameter of the cylindrical space in that claw-pole-pieces 73 are disposed and the outside diameter of the same.

The outside diameter R1 of the cylindrical space that corresponds to the outside diameter of rotor 3 of the test sample is 92 mm, and the outside diameter of the field coil 8 is designed so that space factor of the field coil 8 can be about 68% and the electrical resistance is about 2.3 Ω. The space factor of stator winding 33 is 60% of the slot space of stator core 32. The clearance 6 between the outside diameter of rotor 3 and the inside diameter of the stator 2 is 0.35 mm.

It has been confirmed that the same effect can be obtained although the number of magnetic poles varies to 14 or 16. If the thickness of each steel sheet is less than 0.4 mm, the efficiency of the generator will increase.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An alternator for vehicle comprising:

a stator composed of a stator core having a plurality of tooth edges and a stator winding;

a rotor composed of a pole core having a cylindrical center core, a plurality of claw-pole-pieces alternately extending from opposite axial ends of said pole core in axial directions, a pair of disk yokes disposed between said center core and said claw-pole-pieces and a shaft fixed to said center core, a pair of cooling fans fixed to said opposite axial ends of said pole core and a field coil disposed between said center core, said pair of disk yokes and said claw-pole-pieces, wherein each of said tooth edges has circumferential width X, said plurality of claw-pole pieces are disposed in a cylindrical spaces having outside diameter R1 and inside diameter r1 and are separated from each other at circumferential distance Y, a ratio Y/x of said circumferential distance to said circumferential width is between 2 and 3.3, and a ratio r1/R1 of said inside diameter to said outside diameter is between 0.78 and 0.8.

2. The alternator as claimed in claim 1, wherein said stator core comprises a plurality of laminated steel-sheets each of which is equal to or less than 0.6 mm in thickness.

3. The alternator as claimed in claim 1, wherein each of said tooth edges has axial length Z, and a ratio Z/Lr of said axial length to axial length Lr of said pole core is between 0.75 and 0.95.

* * * * *